United States Patent
Baumgartner (10) Patent No.: US 9,512,916 B2
(45) Date of Patent: Dec. 6, 2016

(54) CUSTOMIZABLE DRIVE FUNCTION MODE SYSTEM AND METHOD

(71) Applicant: Shawn Baumgartner, Gainesville, GA (US)

(72) Inventor: Shawn Baumgartner, Gainesville, GA (US)

(*) Notice: Subject to any disclaimer, the term of this patent is extended or adjusted under 35 U.S.C. 154(b) by 146 days.

(21) Appl. No.: 14/152,563

(22) Filed: Jan. 10, 2014

(65) Prior Publication Data

US 2015/0198235 A1 Jul. 16, 2015

(51) Int. Cl.
| | |
|---|---|
| *G06F 7/00* | (2006.01) |
| *F16H 59/02* | (2006.01) |
| *F16D 48/06* | (2006.01) |
| *B60W 50/00* | (2006.01) |
| *B60W 50/08* | (2012.01) |
| *B60W 50/14* | (2012.01) |
| *B60W 50/16* | (2012.01) |
| *B60W 10/10* | (2012.01) |
| *B60W 20/00* | (2016.01) |
| *B60W 30/00* | (2006.01) |

(52) U.S. Cl.
CPC .......... *F16H 59/0204* (2013.01); *B60W 10/10* (2013.01); *B60W 20/00* (2013.01); *B60W 30/00* (2013.01); *B60W 50/00* (2013.01); *B60W 50/08* (2013.01); *B60W 50/14* (2013.01); *B60W 50/16* (2013.01); *F16D 48/06* (2013.01); *F16H 59/02* (2013.01); *B60W 2540/04* (2013.01); *B60W 2540/14* (2013.01)

(58) Field of Classification Search
CPC .................. F16H 59/0204; F16H 59/02; F16H 2059/026; F16H 2059/0221; B60W 10/10; B60W 20/00; B60W 50/16; B60W 30/00; B60W 50/14; B60W 50/08; B60W 50/00; B60W 2540/04; B60W 2540/14; F16D 48/06

See application file for complete search history.

(56) References Cited

U.S. PATENT DOCUMENTS

| | | | |
|---|---|---|---|
| 6,525,711 B1 | 2/2003 | Shaw et al. | |
| 7,412,908 B2 * | 8/2008 | Hedman | F16H 61/18 74/335 |
| 9,177,486 B2 * | 11/2015 | Best | G09B 19/167 |

(Continued)

FOREIGN PATENT DOCUMENTS

| | | |
|---|---|---|
| FR | 2938489 A1 | 5/2010 |
| GB | 2451732 A | 2/2009 |
| GB | 2498785 A | 7/2013 |

OTHER PUBLICATIONS

European Search Report from corresponding patent application No. EP 15150361 dated Aug. 25, 2016.

*Primary Examiner* — David J Hlavka
(74) *Attorney, Agent, or Firm* — Tutunjian & Bitetto, P.C.; James J. Bitetto (57) ABSTRACT

An on-board system for customizing a vehicle operation mode includes a processing unit, memory coupled to the processing unit and an interface configured to permit interaction between an operator and the memory to input customized vehicle controls and settings for control equipment in the vehicle. A control system is stored in the memory and configured to control the vehicle in accordance with the customized vehicle controls and settings and operator input using the control equipment.

24 Claims, 5 Drawing Sheets

(56) References Cited

U.S. PATENT DOCUMENTS

| | | | | |
|---|---|---|---|---|
| 2002/0139212 A1* | 10/2002 | DeJonge | ................ | B60K 37/06 |
| | | | | 74/473.3 |
| 2007/0137337 A1* | 6/2007 | Kim | .................... | F16H 59/0204 |
| | | | | 74/335 |
| 2009/0146798 A1* | 6/2009 | Gencyuz | ................. | F16H 59/02 |
| | | | | 340/456 |
| 2011/0036191 A1* | 2/2011 | Wolterman | ............. | F16D 48/06 |
| | | | | 74/473.12 |
| 2012/0150371 A1* | 6/2012 | Swales | .................... | B60K 6/485 |
| | | | | 701/22 |
| 2012/0253593 A1* | 10/2012 | Tran | ................... | B60K 31/0008 |
| | | | | 701/36 |
| 2013/0036850 A1 | 2/2013 | Corey et al. | | |
| 2014/0318293 A1* | 10/2014 | Nelson | ................ | F16H 59/0278 |
| | | | | 74/473.3 |
| 2015/0066316 A1* | 3/2015 | Fujii | .................. | F16H 61/0213 |
| | | | | 701/51 |

* cited by examiner

CUSTOMIZABLE DRIVE FUNCTION MODE SYSTEM AND METHOD

BACKGROUND

Technical Field

The present invention relates to virtual controls for selecting or changing driving mode, and more particularly to a software based interface for selecting and controlling a mechanical mode of operation for engine or transmission control in a motor vehicle.

Description of the Related Art

Automatic transmissions ("autos") and the like are composed of versions of torque converter, continuously variable and direct shift gearbox (DSG) transmissions. Any of these transmissions can be fitted with steering wheel mounted shift paddles and the like. Over the past three decades, these versions have become increasing popular over manual transmissions ("sticks"). Traditional sticks have been on the decline since in many vehicles, manual operation may be seen as a chore under everyday driving conditions. Nevertheless, sticks provide many advantages due to their inherent fuel efficiency and performance advantages. The vast majority of cars with manual transmissions are in the compact and subcompact market, although sports cars offer manual transmissions.

A stick car often provides a more satisfying driving experience. Manual transmissions are usually easier to maintain than autos. Most manual transmissions tend to be less complex than autos. A main repair item frequently associated on most stick shifts is the clutch, which need not be changed for hundreds of thousands of miles, under ideal conditions. Manual transmissions use gear oil, engine oil and even automatic transmission fluid in most cases. Unlike when used in an automatic transmission, automatic transmission fluid (ATF), gear oil or engine oil does not deteriorate as quickly over time and does not require frequent changes. This is due to there being no wear based friction surfaces like the multiple clutch packs used in autos. Some manufacturers even suggest that manual transmission fluids do not need changing unless there is a leak or after a repair has been completed.

Fuel economy is usually better in stick-equipped cars. Parasitic power losses from the torque converter and hydraulic pump can rob an auto-equipped car of a small percentage of power, as well as fuel efficiency. Driving a stick car also gives a better sense of control over the vehicle. Without the torque converter constantly pushing you forward, braking is easier. Stick cars are typically cheaper than autos.

Learning how to operate a stick may be difficult. Unlike autos, depressing a clutch pedal with your left leg may lead to repetitive motion issues or other physiological impacts on the joints.

SUMMARY

An on-board system for customizing a vehicle operation mode includes a processing unit, memory coupled to the processing unit and an interface configured to permit interaction between an operator and the memory to input customized vehicle controls and settings for control equipment in the vehicle. A control system is stored in the memory and configured to control the vehicle in accordance with the customized vehicle controls and settings and operator input using the control equipment.

Another system having a customizable operation mode includes a drive function system disposed in a vehicle, the system including a processing unit, memory coupled to the processing unit, and an interface including a display configured to permit interaction between an operator and the memory to input customized vehicle controls and settings for control equipment in the vehicle. A control system is stored in the memory and configured to control the vehicle in accordance with the customized vehicle controls and settings and operator input using the control equipment wherein the control equipment is electronically controlled and includes an automatic mode, a simulated manual mode and a hybrid mode that combines aspects of the automatic mode and the simulated manual mode.

A method for customizing a vehicle operation mode includes providing a drive function system disposed in a vehicle and including a processing unit, memory coupled to the processing unit, an interface configured to permit interaction between an operator and the memory to input customized vehicle controls and settings for control equipment in the vehicle and a control system stored in the memory and configured to control the vehicle in accordance with the customized vehicle controls and settings and operator input using the control equipment; and selecting a vehicle operation mode in the drive function system by indicating the customized vehicle controls and settings for the control equipment using the interface, the customized vehicle controls and settings for the control equipment including an automatic mode, a simulated manual mode and a hybrid mode that combines aspects of the automatic mode and the simulated manual mode.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for customizing a driving experience by employing virtual or manual controls that can set the amount of interaction between a driver and the vehicle. Transmission settings and control points may be selected and set for individual drivers to provide a hybrid driving experience with some or all of, e.g., manual transmission controls or some or all of automatic transmission controls.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 1:
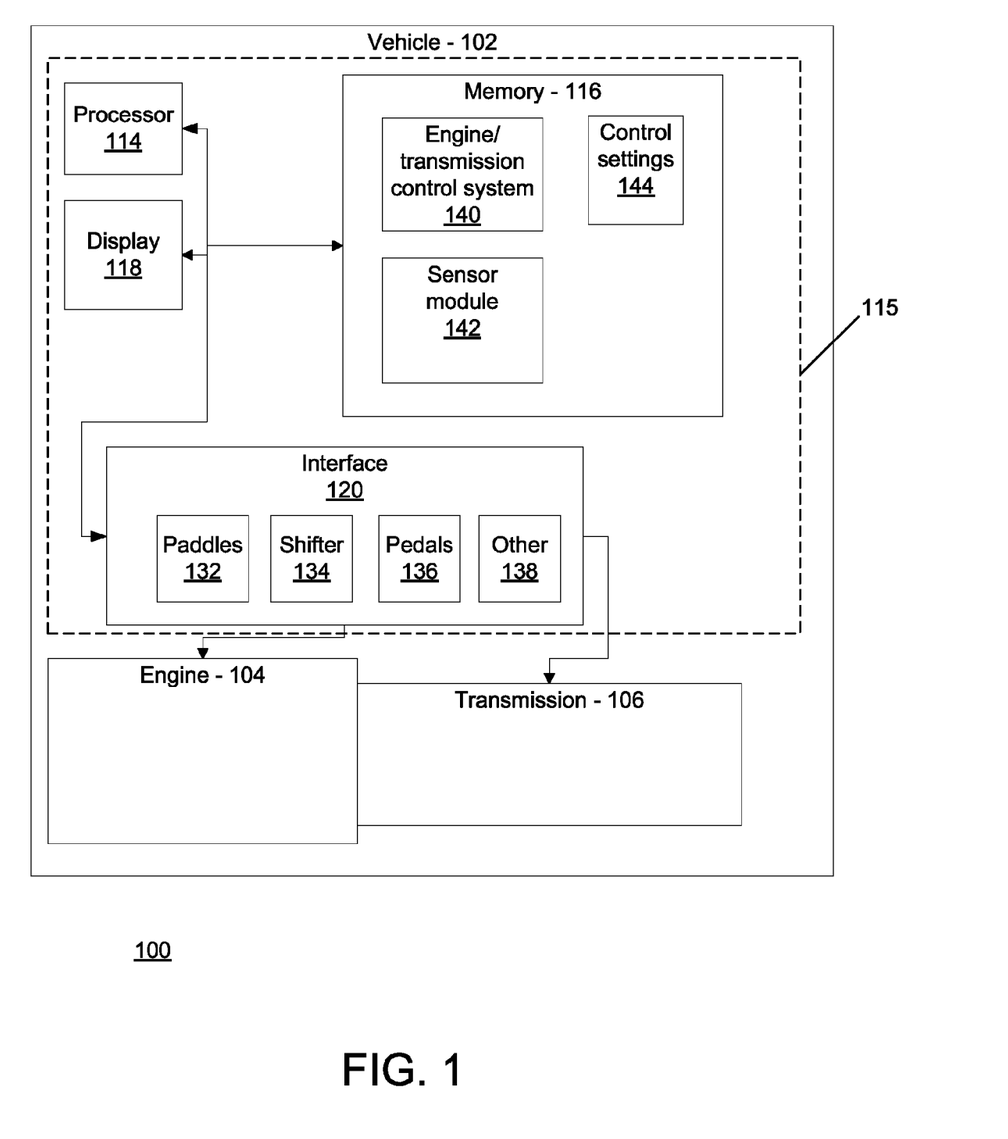
FIG. 1 is a block/flow diagram showing a drive function system in accordance with the present principles.

Referring now to the drawings in which like numerals represent the same or similar elements and initially to FIG. 1, a schematic block/flow diagram shows a system 100 for customizing a driving experience in accordance with the present principles. System 100 includes a vehicle 102, which may include any vehicle having an engine 104 and a transmission 106, e.g., an automobile, a boat, an all-terrain vehicle, a motorcycle, etc. Some or all of the systems may also be employed in video games or driving/flying simulators, etc. The vehicle 102 includes the transmission 106 coupled to the engine 104. The engine 104 may include an internal combustion engine, a diesel engine, a bio-fuel engine, an electric engine, a hybrid engine, etc. The transmission 106 may include any number of gears to provide a balance between speed and power (and direction (reverse)) in accordance with known transmission mechanisms. The vehicle 102 includes a processor 114, which may include a computer processing unit (CPU), a transmission control unit (TCU) and/or an engine control unit (ECU) for controlling vehicle systems.

Memory 116 is coupled to the processor 114. Memory 116 may include a memory storage device such as a hard drive, solid-state memory, etc. Memory 116 includes software modules or programs configured to control and manage vehicular systems. The vehicle 102 is configured to provide a drive function system 115, which is capable of being adjusted to provide a driving mode customized by an operator or automatically by the system 100. The drive function system 115 includes the processor 114, memory 116 and one or more items controlled by the processor 114, memory 116, which may include a display 118, and an interface 120.

In particularly useful embodiments, an engine or transmission control system 140 is stored in memory 116. The control system 140 may be part of an engine control unit, a transmission control unit, be a separate unit or be distributed between and among such units. The control system 140 manages user customizable settings and controls an interface 120 between an operator and the engine 104 and/or transmission 106.

The interface 120 may include a number of manual or virtual controls that are configured to be responsive to operator actions. In particularly useful embodiments, the interface 120 may include paddles 132, a shifter 134, a pedal 136 or other controls or mechanisms 138. The other controls and mechanisms 138 may include the brake system/pedal, the throttling system/gas pedal, the steering system/steering wheel, etc. The shifter 134 may include an electronic shifter configured to have the look and feel of a manual shifter with shift gates; however, the shifter 134 provides an input to the processor 114 and/or control system 140 to determine the gear setting without a manual link to the transmission. The shifter 134 includes a sensor (or sensors 204, FIG. 2) configured to measure its position within the shifter gate to provide the setting to a sensor module 142. The shifter 134 may provide haptic or other feedback (e.g., stiffness of the shifter 134 in the shifter gate) to the operator to permit a realistic shifter function. The shifter 134 may include a vibration device that is activated and controlled by the control system 140 to provide feedback in accordance with the shifter position and/or other conditions.

Pedal(s) 136 may include an electronic pedal configured to have the look and feel of a manual clutch pedal; however, the pedal 136 provides an input to the processor 114 and/or control system 140 to determine an amount of deflection of the pedal 136. The pedal 136 may include a potentiometer or other measurement device that measures the movement of the clutch pedal 136. The amount of deflection may be saved as a driver preference or setting in control settings 144. In this way, an amount of deflection of the pedal 136 can be employed to cause a gear shift as preferred by the operator. The clutch pedal 136 is preferably an electronic pedal without a manual link to the actual clutch. The pedal 136 may provide haptic or other feedback to the operator to permit for a realistic function. The pedal 136 may include a vibration device that is activated and controlled by the control system 140 to provide feedback in accordance with the pedal position and/or other conditions.

The interface 120 preferably includes a graphical user interface (which can be displayed on the display 118). The interface 120 permits the operator to select the desired functionality of the interface 120 and the control settings 144 stored in memory 116 employed to provide a desired driving experience. The operator can mix and match features and settings to derive a hybrid automatic/manual transmission experience, set feedback controls, set the length of shifts, set control points for virtual clutch engagement (high, medium, low or any point in the pedal's movement), etc. The interface 120 may include an in-vehicle touchscreen display (118) or similar interface control (mouse controller, joystick, cursor and arrow keys, wireless controls (e.g., Bluetooth™), etc.). In this way, the operator can customize manual input controllers, such as an electronic clutch (e-clutch) pedal engagement points, e-shifter gate stiffness, e-shifter gate length, etc.

The drive function system 115 may be set to a full automatic mode where the processor 114 and/or memory 116 control functions to provide seamless traditional automatic operation of the transmission 106 and/or the engine 104. Multiple automatic modes may also be selectable, e.g., economic mode, standard mode, sport mode, race mode, a customized user created mode, etc. Multiple manual modes may also be selectable, e.g., engage clutch only to change gears, shift only to change gears, shift and engage the clutch to shift gears, etc.

In accordance with the present principles, a direct-shift gearbox (DSG) transmission or any manu-matic/automatic transmission or device can be controlled to exactly shift via the interaction of the electronic clutch pedal and the shifter inputs. This makes automatic transmissions (autos) completely manual again which is completely the opposite of what the autos were designed for. The present system 100 re-engages the traditional manual driver who has been alienated by automatic transmissions. Despite the fact that a manu-matic shifts faster in full auto mode than a human can, it is the feel of the experienced driver that determines the most optimal input and timing of shifting inputs. Full auto mode can now be employed with manual mode and hybrid modes to optimize driving performance and the driving experience. A manual purist will get the best of both worlds and get the ability to tune the system, which does not exist with traditional mechanical linkages.

Figure 2:
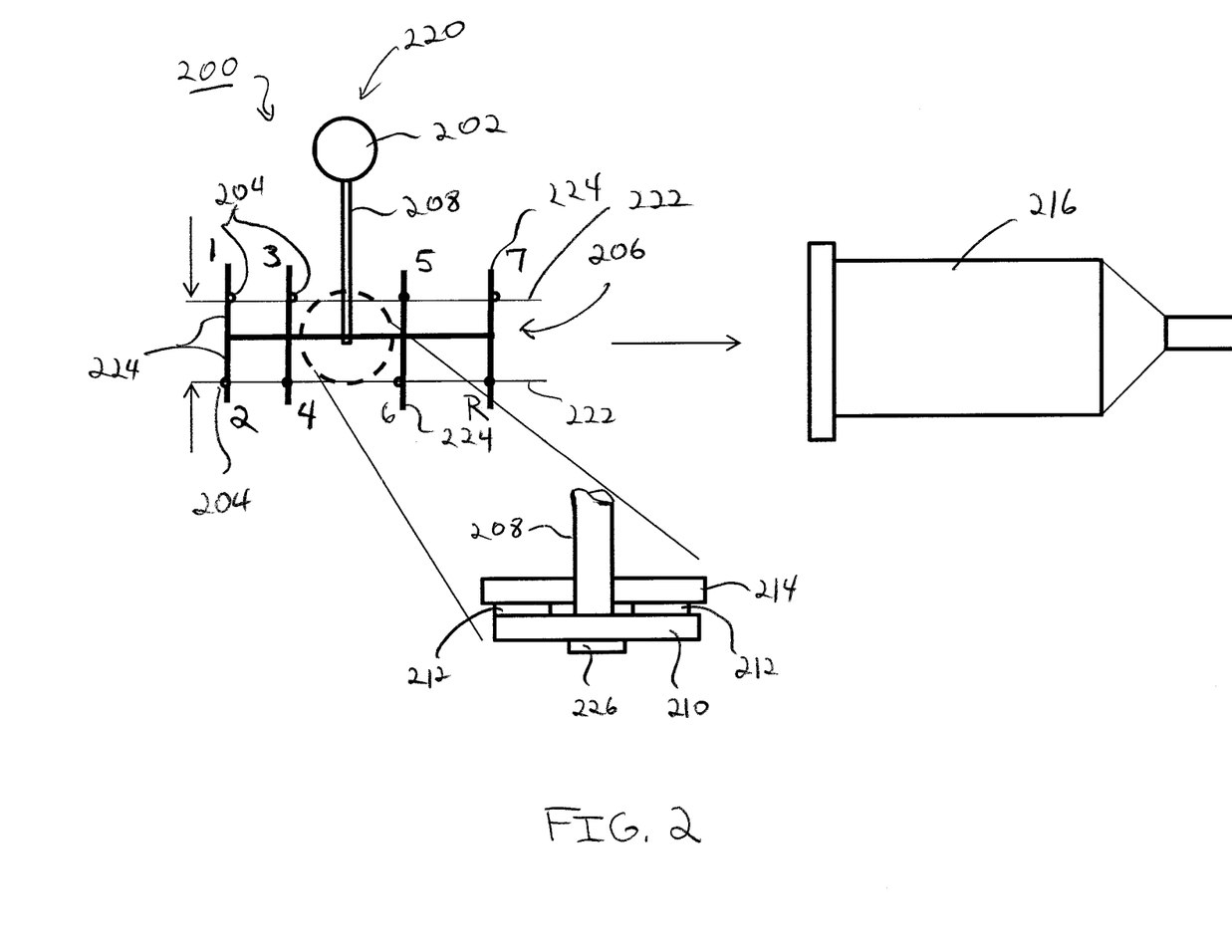
FIG. 2 is a schematic diagram showing an electronic shifter (e-shifter) for controlling a transmission in accordance with the present principles.

Referring to FIG. 2, a schematic diagram shows an e-shifter assembly 200 in accordance with one illustrative embodiment. The e-shifter assembly 200 includes a shifter 220, which includes a shaft 208 and a handle 202 configured to move within a shifter gate 206. The shifter gate 206 illustratively shows seven gear settings (1-7) and a reverse (R) setting. Other numbers of gear settings are also contemplated. Each corresponding gear position includes a sensor 204 configured to sense a position of the shaft 208 relative to the shifter gate 206. The position of the shaft 208 is relayed to the control system (140, FIG. 1) and is employed to engage a gear setting in a transmission, such as a direct-shift gearbox (DSG) transmission 216 or equivalent.

The base of the shaft 208 may include a flange 210 or other components that extend radially outward from the shaft 208. The flange 210 may support actuators 212, which are configured to expand in accordance with a signal from the control unit 140. The signal from the control unit is proportional to the amount of stiffness selected by the user or associated with a particular mode of operation. The expansion of the actuators 212 causes increased friction and therefore stiffness for the shaft 208 against a top plate 214 of the shifter gate 206. While the actuators 212 may be employed to increase stiffness, other mechanisms are also contemplated.

In some embodiments, an adjustable throw length can be provided by bars or rods 222 disposed transversely to gate bays 224. The bars or rods 222 may be manually controlled or actuated in accordance with the control system 140 (FIG. 1) to control the amount of throw for the e-shifter 220. It should be understood that other mechanical arrangements, e.g., pins, protrusions, etc. may be employed instead of or in addition to bars or rods 222. The bars or rods 222 are configured to come across from either side of shifter frame or gate 206 and reduce the throw length through each bay 224. In one embodiment, three or four discrete shift lengths (e.g., long, medium, short and ultra short) may be employed, although any throw length adjustment may be made/customized. The sensors 204 may be mounted on the bars/rods 222 to detect the position of the arm 208 in each bay 224. The sensors 204 may include contact sensors, pressure sensors, optical sensors, etc.

A vibrational device 226 may be provided to impart controlled vibrations through the e-shifter 220. The vibrational modes may be user selected and may include different frequencies depending on the gear selected or based upon a particular user mode (sport, economy, etc.). The vibrational device 226 may include an electrically driven imbalanced rotational load or the like.

In automatic embodiments, no special mode will need to be selected by the operator as a fully automatic mode can be set as the default. The option to use either option A, B, C, etc. can be chosen through the user interface 120 depending on existing or future methodologies. Mode control will be a user selectable option for all modes. The modes of operation may include the following. In a mode A, an operator may select a traditional front console style automatic shifter with a manual shift gate, as currently available on many vehicles. Otherwise, the shifter includes the ability to select each gear in a locked singular use methodology. In mode B, the manual style shifter is chosen by the operator as an option for shifting via a manual style shifter without the need for a clutch pedal. The software parameters will be similar to that for steering wheel mounted paddles with a longer shift period for gate-to-gate motion. In a mode C, steering wheel mounted paddle shifters can be included in the system to complete the dynamic for those already inclined to this method of shifter control. Other modes, e.g., hybrid modes, may also be employed.

In manual embodiments, the inclusion of steering wheel mounted paddle shifters may also be provided. No special mode will need to be selected by the user as the fully manual mode will be the default. If the user wishes to choose a different mode, the users may do so at either the time of standby (KOEO or BPEO) or with the engine already started. The user may also select from any of the shift options at any time through the user interface 120 depending on the existing or future methodologies. Mode control will be a user selectable option for all modes. The modes for manual shifting may include the following. In an F manual mode, normal clutch and shifter use is provided with or without the option for rev (engine revolutions per minute) matching, which can be selected and saved as a user preference in the user interface. No rev matching can be the default. An additional selection between normal, sport, etc. may be available through the interface 120 and can be changed at any time. In one embodiment, sport will also offer the option of no lift shift.

In a P manual mode, shifting by steering wheel mounted paddles only may be provided. This may be with or without the option for rev matching which can be selected and saved as a user preference in control settings 144. Rev match will be the default in this mode. An additional choice of normal, sport, etc. will be available through the interface 120 and can be changed at any time. In an S manual mode, shifting may be done by manual shifter only; no clutch pedal action is necessary. This may be performed with or without the option for rev matching which can be selected and saved as a user preference in control settings 144 using the user interface 120. No rev match can be the default. Other modes, control settings 144 and customizations are also contemplated.

Figure 3:
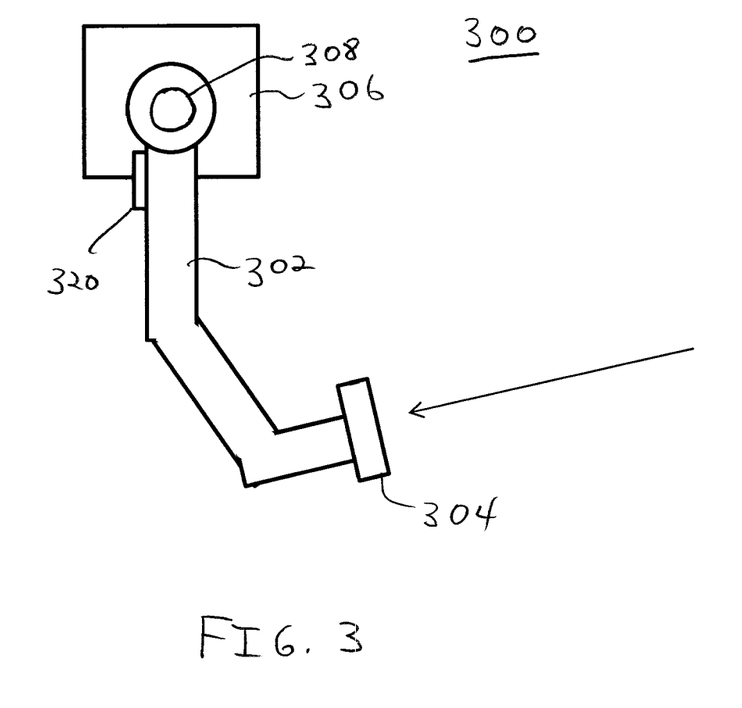
FIG. 3 is a schematic diagram showing an electronic clutch pedal (e-clutch pedal) for controlling a transmission in accordance with the present principles.

Referring to FIG. 3, a clutch pedal assembly 300 is shown in accordance with one illustrative embodiment. The clutch pedal assembly 300 is preferably an electronic feedback device that measures deflection, force or other parameters to determine when to engage or disengage a mechanical clutch. In one embodiment, a potentiometer 306 measures the rotational displacement of an arm 302 having a pedal 304 on its free end portion. In one embodiment, shifting gears may be enabled by depressing the clutch pedal 304 to down shift or upshift. The direction of the shift may be controlled using a paddle on the steering wheel or using another control or mechanism. In other embodiments, the clutch pedal 304 is employed in a conventional way along with other driving customizations provided in accordance with the present principles.

The arm 302 of the clutch pedal assembly 300 can be adjusted using an electronically controlled biasing device 308 that can increase or decrease the stiffness response associated with the deflection of the arm 302. The biasing device 308 may employ adjustable friction in a bearing, torque springs, hydraulics (e.g., a hydraulic cylinder), etc. to adjust the stiffness. The stiffness may be customized by the operator to fit desired operating conditions.

As with a mechanical clutch, the amount of deflection of the pedal 304 needed to enable gear shifting can be customized. The operator can program a control point or control points into the system that will represent an amount of deflection needed to achieve enough engagement to enable gear shifting. For some operators, a slight deflection of the pedal 304 will be desired while other may desire a larger deflection. In some embodiments, the control points may be different depending on the gear being shifted to or depending on the drive mode selected (e.g., sport versus economy, etc.).

A vibrational device 320 may be provided to impart controlled vibrations through the e-pedal arm 302. The vibrational modes may be user selected and may include different frequencies depending on the gear selected or based upon a particular user mode (sport, economy, etc.). The vibrational device 320 may include an electrically driven imbalanced rotational load or the like.

Figure 4:
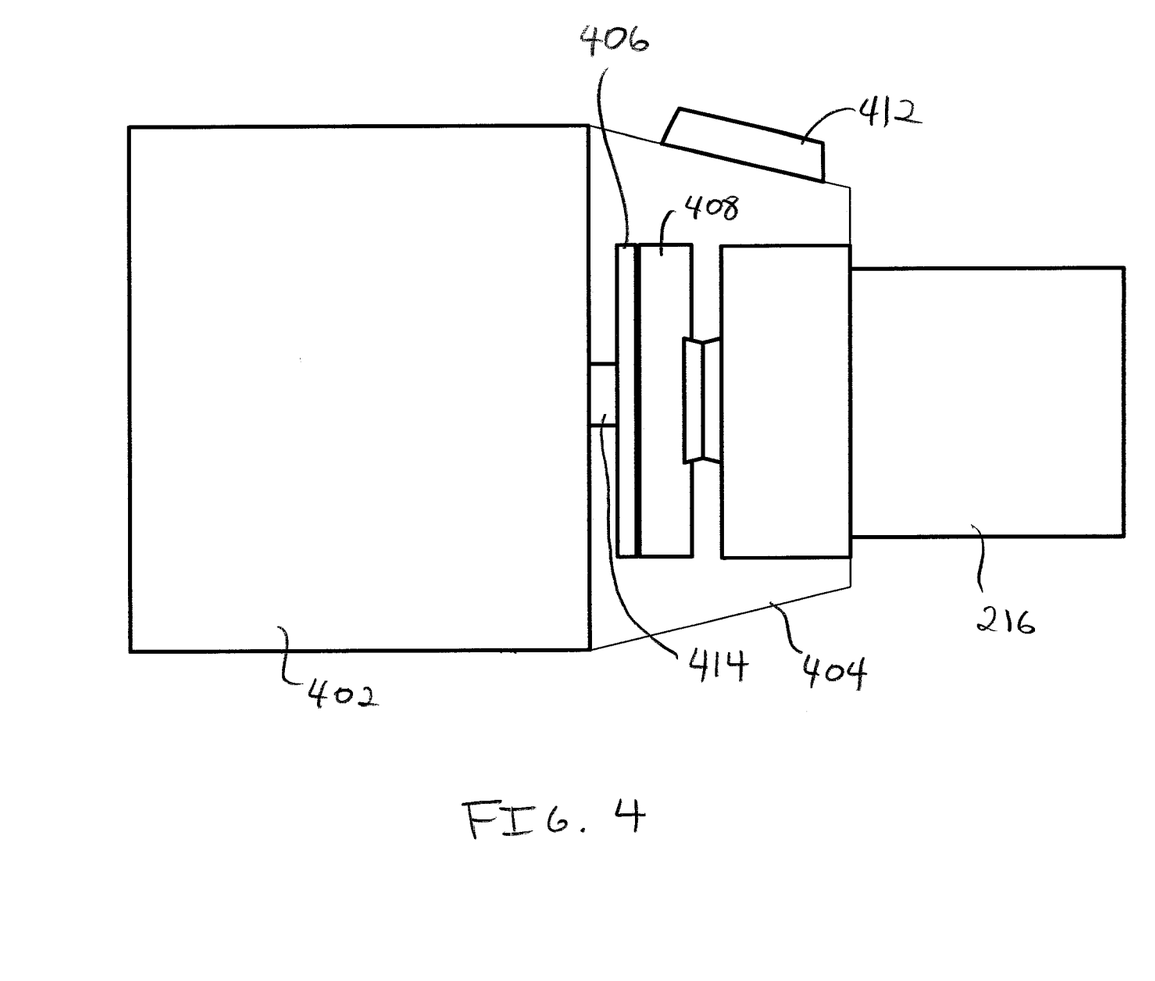
FIG. 4 is a schematic diagram showing an electronic actuator for controlling a mechanical clutch in accordance with the present principles.

Referring to FIG. 4, an illustrative diagram shows one embodiment, which permits electronic control of mechanical components. An engine 402 transfers energy to a clutch 408 and flywheel 406 through a crankshaft 414. The clutch 408 is engaged or disengaged to shift gears housed in a transmission 216 by a hydraulic actuator 412. The hydraulic actuator 412 receives a signal from the engine control unit or processor unit 114 when the clutch pedal 304 is depressed. The signal enables the hydraulic cylinder 412 to move the clutch 408 to engage or disengage gears. No mechanical linkages are necessary to actuate the clutch 408. It should be noted that a clutch housing 404 has been simplified and that many components have been omitted for simplicity. The mechanical connections between the old technology of a clutch master cylinder and a clutch slave cylinder/slave bearing are therefore replaced with the clutch pedal assembly 300 and clutch slave/bearing 412.

It should be understood that the drive function system 115 may be extended to other mechanical systems and be employed to customize the interfaces for such systems. For example, drive function system 115 may be applied to customize the feel of response of the braking system, of the throttling or acceleration system or of the steering wheel/ steering mechanism. The braking system, acceleration system and steering wheel mechanism could provide electronic signals for controlling mechanisms, and the operation and feel of the brake system, acceleration system and steering wheel can be adjusted using feedback mechanisms (e.g., vibration, stiffness, etc.). The drive function system 115 can be integrated into existing engine control units (ECUs) as an additional software module or modules or as a plug-and-play ECU that integrates with the original ECUs.

Feedback from the steering, acceleration and brake systems and engine performance may be provided as options for driver customization. For example, the brake pedal pressure can be set to the operator's liking, e.g., some may like a hard initial pedal with a high engagement point while others may like a slightly softer initial feel with progressively harder response with increasing effort. This applies to the gas pedal and steering wheel and other systems as well.

In one embodiment, the drive function system 115 may be employed as a driver training tool. The control system 140 may be set to a training mode to enable a new or inexperienced driver to learn how to drive a stick. The clutch pedal 304 and shifter 220 could move slightly (not completing the full travel, e.g., 10% of full deflection) when a shift is recommended. This initial deflection can served as a queue for a learner to let the learner know it is an appropriate time to press the pedal 304 and move the shifter 220 to a next gear. In one embodiment, a lock out may be provided so the shifter 220 cannot go into any gear location but the next one up (at least in the training mode). The throw length control mechanism (bars) 222 can be modified to permit the lockout function. The bars 222 may be configured to work with individual bays 224. In this way, the gear shifter 220 will not allow a downshift, (or upshift) that would be detrimental to the engine or even the car if the vehicle is advanced enough to know that the downshift would cause the wheels to initially skid or other detrimental result. In economy mode, a skip shift could be implemented using lock-out bars 222 for individual bays 224. This could force the driver to the most efficient upshift, which could be two or three gears or more.

Figure 5:
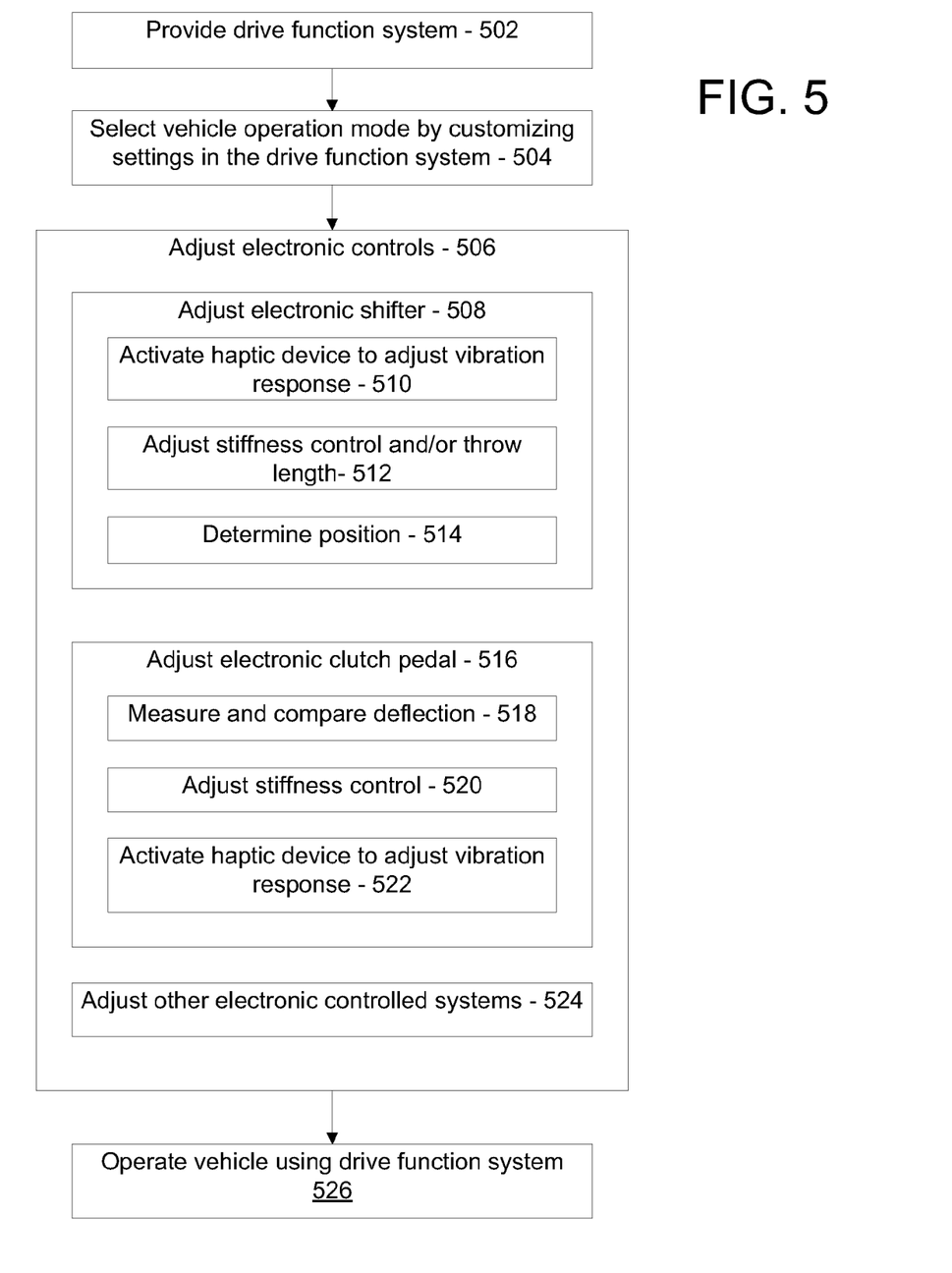
FIG. 5 is a block/flow diagram for a method for customizing a vehicle operation mode in accordance with illustrative embodiments.

Referring to FIG. 5, a method for customizing a vehicle operation mode is shown in accordance with illustrative embodiments. In block 502, a drive function system disposed in a vehicle is provided and includes a processing unit, memory coupled to the processing unit, an interface configured to permit interaction between an operator and the memory to input customized vehicle controls and settings for control equipment in the vehicle and a control system stored in the memory and configured to control the vehicle in accordance with the customized vehicle controls and settings and operator input using the control equipment. In block 504, a vehicle operation mode is selected or customized in the drive function system by indicating the customized vehicle controls and settings for the control equipment using the interface. The customized vehicle controls and settings for the control equipment include an automatic mode, a simulated manual mode and a hybrid mode that combines aspects of the automatic mode and the simulated manual mode. In block 506, the electronic control equipment is adjusted, programmed and/or customized.

In block 508, the control equipment may include an electronic shifter, which may be adjusted and may include: activating a haptic device (or mode thereof) to permit operator-adjusted feedback for a vibrational response to simulate a manual shifter in block 510; adjusting a stiffness and/or throw length of an actual shift using a control mechanism to permit operator-adjusted feedback to simulate a manual shifter in block 512; determining a position of the electronic shifter to provide a signal to a mechanical transmission to indicate a selected gear in block 514, etc.

In block 516, the control equipment may include an electronic clutch pedal, which may be adjusted and may further include: measuring a deflection of the clutch pedal and comparing the deflection with operator-programmed control points stored in the memory to determine an action for a mechanical clutch in block 518; adjusting a stiffness control mechanism to permit operator-adjusted feedback to simulate a manual clutch pedal in block 520 and/or permitting operator-adjusted feedback for a vibrational response (a haptic device) to simulate a manual clutch in block 522, etc.

In block 524, the control equipment may include other electronically controlled systems including, e.g., the braking system, the steering system, etc. The controls may include electronic input to the control system determined in accordance with user adjustments to the brake pedal, gas pedal, steering wheel, etc. The brake pedal, gas pedal and steering wheel may include vibrational and other feedback mechanisms to provide a realistic feel as described for the other systems.

In block 526, the vehicle is operated (e.g., driven) in accordance with the user-customized settings of the drive function system.

The present principles support full customization by an end user with a high level of customization. The present principles permit customization of vehicle systems and also provide manufacturers with option tuning capability. It should be noted that the present principles are applicable on other platforms including aircraft, boats, video games, etc. In one embodiment, data collected, e.g., for feedback (e.g., haptic, stiffness, etc.) and mechanisms for the control devices (throw length control mechanism (bars or rods), etc.) may be implemented for use in video game controls or other simulators.

Having described preferred embodiments for customizable drive function mode systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An on-board system for customizing a vehicle operation mode, comprising:
   a processing unit;
   memory coupled to the processing unit;
   an interface configured to permit interaction between an operator and the memory to input customized vehicle controls and settings for control equipment in the vehicle; and
   a control system stored in the memory and configured to control the vehicle in accordance with the customized vehicle controls and settings and operator input using the control equipment, wherein the control equipment includes an electronic shifter and the electronic shifter includes an automatic mode, a simulated manual mode and a hybrid mode that combines aspects of the automatic mode and the simulated manual mode.

2. The system as recited in claim 1, wherein the electronic shifter includes a haptic device to permit operator-adjusted feedback for a vibrational response to simulate a manual shifter.

3. The system as recited in claim 1, wherein the electronic shifter includes a stiffness control mechanism to permit operator-adjusted feedback to simulate a manual shifter.

4. The system as recited in claim 1, wherein the electronic shifter includes a throw length control device to permit operator-adjusted shift gate throw length.

5. The system as recited in claim 1, wherein the electronic shifter includes one or more sensors for determining a position of the electronic shifter, the sensor configured to provide a signal to a mechanical transmission to indicate a selected gear.

6. The system as recited in claim 1, wherein the control equipment includes an electronic clutch pedal and the electronic clutch pedal includes a deflection measurement device such that when the clutch pedal is deflected, the deflection is compared with operator programmed control points store in the memory to determine an action for a mechanical clutch.

7. The system as recited in claim 6, wherein the electronic clutch pedal controls an electronic actuator for moving the mechanical clutch.

8. The system as recited in claim 6, wherein the electronic clutch pedal includes at least one of a stiffness control mechanism or a haptic control mechanism to permit operator-adjusted feedback to simulate a manual clutch pedal.

9. The system as recited in claim 1, wherein the interface includes a graphical user interface with an input device, the interface including a plurality of user-selectable customizable features, which can be selected and adjusted to configure the control equipment for a particular operator.

10. The system as recited in claim 1, wherein the control system receives electronic signals from the control equipment and responds by causing one or more mechanical devices to perform a mechanical function.

11. A system having a customizable operation mode, comprising:
    a drive function system disposed in a vehicle, the system including:
    a processing unit;
    memory coupled to the processing unit;
    an interface including a display configured to permit interaction between an operator and the memory to input customized vehicle controls and settings for control equipment in the vehicle; and
    a control system stored in the memory and configured to control the vehicle in accordance with the customized vehicle controls and settings and operator input using the control equipment wherein the control equipment is electronically controlled and includes an automatic mode, a simulated manual mode and a hybrid mode that combines aspects of the automatic mode and the simulated manual mode.

12. The system as recited in claim 11, wherein the control equipment includes an electronic shifter having a haptic device to permit operator-adjusted feedback for a vibrational response to simulate a manual shifter.

13. The system as recited in claim 11, wherein the control equipment includes an electronic shifter having a stiffness control mechanism to permit operator-adjusted feedback to simulate a manual shifter.

14. The system as recited in claim 11, wherein the control equipment includes an electronic shifter having a throw length control device to permit operator-adjusted shift gate throw length.

15. The system as recited in claim 11, wherein the control equipment includes an electronic shifter having one or more sensors for determining a position of the electronic shifter, the sensor configured to provide a signal to a mechanical transmission to indicate a selected gear.

16. The system as recited in claim 11, wherein the control equipment includes an electronic clutch pedal and the electronic clutch pedal includes a deflection measurement device such that when the clutch pedal is deflected, the deflection is compared with operator programmed control points stored in the memory to determine an action for a mechanical clutch.

17. The system as recited in claim 11, wherein the control equipment includes an electronic clutch pedal that controls an electronic actuator for moving a mechanical clutch.

18. The system as recited in claim 11, wherein the control equipment includes an electronic clutch pedal having one of a stiffness control mechanism or a haptic control mechanism to permit operator-adjusted feedback to simulate a manual clutch pedal.

19. The system as recited in claim 11, wherein the interface includes a graphical user interface with an input device, the interface including a plurality of user-selectable customizable features, which can be selected and adjusted to configure the control equipment for a particular operator.

20. The system as recited in claim 11, wherein the control system receives electronic signals from the control equipment and responds by causing one or more mechanical devices to perform a mechanical function.

21. A method for customizing a vehicle operation mode, comprising:
    providing a drive function system disposed in a vehicle and including a processing unit, memory coupled to the processing unit, an interface configured to permit interaction between an operator and the memory to input customized vehicle controls and settings for control equipment in the vehicle and a control system stored in the memory and configured to control the vehicle in accordance with the customized vehicle controls and settings and operator input using the control equipment; and selecting a vehicle operation mode in the drive function system by indicating the customized vehicle controls and settings for the control equipment using the interface, the customized vehicle controls and settings for the control equipment including an automatic mode, a simulated manual mode and a hybrid mode that combines aspects of the automatic mode and the simulated manual mode.

22. The method as recited in claim 21, wherein the control equipment includes an electronic shifter and further comprising at least one of:

activating a haptic device to permit operator-adjusted feedback for a vibrational response to simulate a manual shifter;

adjusting a stiffness control mechanism to permit operator-adjusted feedback to simulate a manual shifter;

controlling a throw length for a shift gate; or determining a position of the electronic shifter to provide a signal to a mechanical transmission to indicate a selected gear.

23. The method as recited in claim 21; wherein the control equipment includes an electronic clutch pedal and further comprising at least one of:

measuring a deflection of the clutch pedal and comparing the deflection with operator programmed control points stored in the memory to determine an action for a mechanical clutch;

adjusting a stiffness control mechanism to permit operator-adjusted feedback to simulate a manual clutch pedal; or adjusting a vibration response to permit operator-adjusted feedback to simulate the manual clutch pedal.

24. A non-transitory computer readable storage medium comprising a computer readable program for customizing a vehicle operation mode, wherein the computer readable program when executed on a computer causes the computer to perform steps of claim 21.

* * * * *